Figure 1:
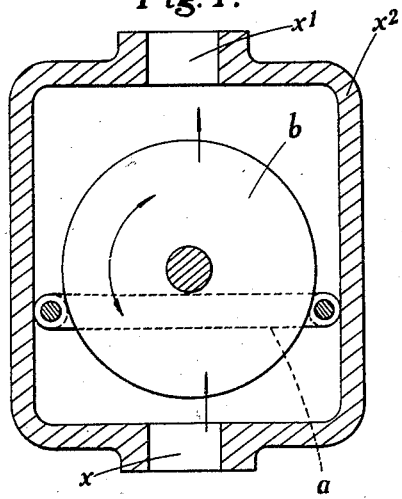

Sept. 13, 1932.  F. C. FULCHER  1,877,451
FILTERING OR FINE STRAINING APPARATUS FOR LIQUIDS
Filed Feb. 25, 1932

INVENTOR
Frank Christian Fulcher
BY
Nathan, Bowman & Helferich
ATTORNEYS

Patented Sept. 13, 1932

1,877,451

UNITED STATES PATENT OFFICE

FRANK CHRISTIAN FULCHER, OF PURLEY, ENGLAND

FILTERING OR FINE STRAINING APPARATUS FOR LIQUIDS

Application filed February 25, 1932, Serial No. 595,058, and in Great Britain August 15, 1930.

The present invention relates to improvements in or relating to filtering or fine straining apparatus for fluids of the kind in which the fluid is passed through a series of fine slots, slots of 2/100″ or less width for example serving well for the fine straining of such liquids as petrol, paraffin, fuel oil, lubricating oil, oil paint, varnish, water, etc.

According to the present invention the filter comprises two series of members, one series consisting of rotatable discs, and the other of fixed strips interposed between such discs but in non-contacting relationship therewith, the whole being so mounted or arranged that the only possible paths for the liquid is between a disc and an adjacent strip.

By such construction I obtain a filter in which a graduated trapping or intercepting of foreign matter is obtained so that the coarser particles will be intercepted between adjacent discs, and the finer between the discs and the adjacent strips. By making the discs of different diameters further stages of trapping will be obtained.

This construction also provides for rapid and effective cleansing of the filter since when the discs are rotated the finer matter will be forced out from between the discs and strips either towards the inlet or outlet side of the filter, the coarser matter, or the bulk thereof remaining on the inlet side of the slits. Preferably flushing means are provided to assist in the cleansing.

It will be observed that when the discs are rotated the movement of the points of the discs that traverse the strips will be wholly or partly transverse to the same which renders the cleansing more effective.

The strips may be of any suitable form. Stretched wires may be used.

In the drawing:—

Figure 4:
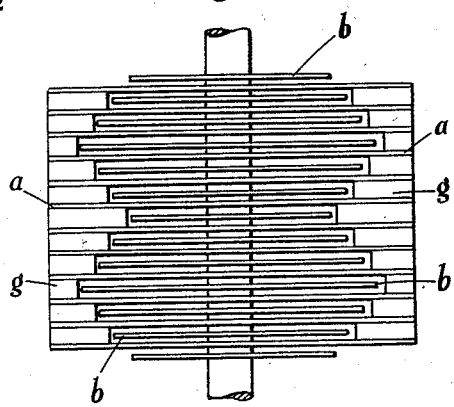
Figure 2:
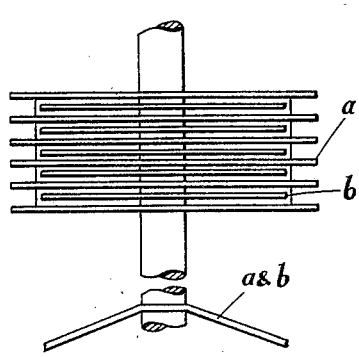
Figure 5:
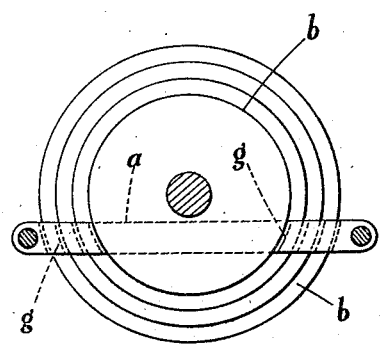
Figure 3:
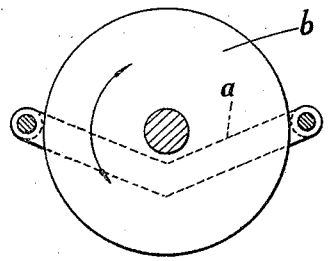
Figure 6:
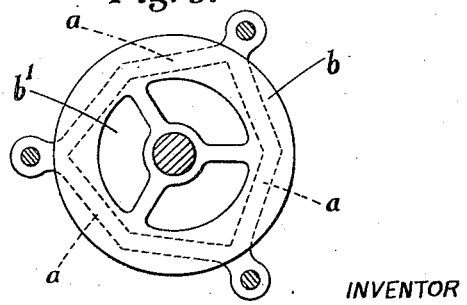

Figs. 1 and 2 represent plan and side views, respectively, of portions of a filtering device incorporating this invention. Fig. 3 is a view illustrating an angular or bent form of the fixed members. Figs. 4 and 5 are views similar to the structure illustrated in Fig. 1, and illustrate a staggered arrangement of the discs. Fig. 6 is a modification illustrating three blades extending at an angle to one another and joined at their ends to form a triangular blade.

Figs. 1 and 2 show an arrangement having fixed strip members $a$ and movable members $b$. The movable members $b$ are rotating disc members giving a cross or transverse cleaning effect. Fig. 3 shows an angular or bent form of fixed member $a$. One way of rotating the members $b$ may be by a ratchet device. As indicated at the bottom of Fig. 2 the members may be of conical form.

In Fig. 1 $x$ indicates the inlet to and $x^1$ the outlet from the casing $x^2$.

Figs. 4 and 5 illustrate a similar arrangement to Figs. 1 and 2. Distance pieces or spacing components $g$ are provided. In all cases the arrangement must be such that either by means of these spacing components or otherwise the liquid to be strained is forced to pass between the discs and strips.

Fig. 6 shows three blades $a$, $a^1$ and $a^2$ set at an angle to one another, the equivalent of which is a triangular blade. A centre outlet is shown by $b^1$ in the plate $b$.

It is to be understood that although for the sake of clearness in the drawing the fixed and movable members are shown well spaced apart, the slots in the actual constructions are fine slots as previously defined in the opening paragraphs of the specification.

Filters or fine strainers under the present invention may conveniently take the form of ranks or piles, in single or multiple and in parallel or in series as desired.

I claim:

1. A filter or fine straining apparatus combining a casing member having inlet and discharge ports formed therein; a series of stationary strip members supported by said casing and arranged in spaced relation so that a series of slots is formed between the opposed surfaces of said members; a series of discs arranged in parallel relation and interposed between the members of said first series and in spaced relation therewith so that the entire flow and discharge of the liquid through the filter takes place between the opposed surfaces of adjacent discs and strips and in a direction paralleling the plane of the discs, said series of discs being fixedly mounted upon a rotatable shaft member journaled adjacent said series of strip members; and means for rotating said discs across or transverse to said strips.

2. In a filtering or fine straining apparatus for liquids in which the filtering is accomplished by passing the liquid through a plurality of fine slots the combination of a series of discs mounted to rotate upon a common axis and a series of stationary strip members interposed between the rotatable members adjacent the axes of said discs and in non-contacting relation therewith so that a series of fine slots extending through the filter in planes paralleling the discs is formed between the opposed surfaces of the discs and strips; and means for rotating said rotatable discs.

3. A filter or fine straining apparatus for liquids combining a series of rotatable disc members of different diameters arranged in parallel spaced relation on a common axis so that a graduated trapping of foreign material occurs as the liquid passes through the filter; a series of strip members interposed between said rotatable members and in non-contacting relation therewith so that a series of fine slots is formed between the adjacent faces of the strips and discs for the passage of liquid therethrough; filler members interposed between the strip members in the openings extending beyond the peripheries of said disc members for blocking the flow of liquid therethrough; and means for rotating said discs to dislodge particles of foreign matter intercepted by said members.

In testimony whereof, I affix my signature.

FRANK CHRISTIAN FULCHER.